United States Patent
Konopka et al.

[11] Patent Number: 6,144,539
[45] Date of Patent: Nov. 7, 2000

[54] ARRANGEMENT FOR PROTECTING LOW-VOLTAGE CONTROL CIRCUITRY FROM EXTERNALLY APPLIED HIGH VOLTAGES, AND DIMMING BALLAST EMPLOYING SUCH AN ARRANGEMENT

[75] Inventors: John G. Konopka, Deer Park; Sameer Sodhi, Palatine, both of Ill.

[73] Assignee: Osram Sylvania Inc., Danvers, Mass.

[21] Appl. No.: 09/226,758

[22] Filed: Jan. 6, 1999

[51] Int. Cl.[7] ........................................... H02H 3/20
[52] U.S. Cl. ..................... 361/91.2; 323/905; 315/352; 315/DIG. 7
[58] Field of Search .................. 361/54, 56, 58, 361/18, 93.4, 93.7, 93.9, 91.2, 91.5; 323/908, 905; 315/224, 349, 362, DIG. 4, DIG. 7

[56] References Cited

U.S. PATENT DOCUMENTS

| | | | |
|---|---|---|---|
| 3,921,035 | 11/1975 | Holmes | 315/307 |
| 5,038,081 | 8/1991 | Maiale, Jr. et al. | 315/291 |
| 5,374,887 | 12/1994 | Drobnik | 323/299 |
| 5,457,360 | 10/1995 | Notohamiprodjo et al. | 315/219 |

OTHER PUBLICATIONS

ST Microelectronics Application Note, L6574 CFL/TL Ballast Driver Preheat and Dimming, Sep. 1998.

*Primary Examiner*—Ronald W. Leja
*Attorney, Agent, or Firm*—Carlo S. Bessone

[57] ABSTRACT

An arrangement for protecting low-voltage control circuitry from externally applied high voltages comprises a voltage source (30) and a current-sourcing circuit (40). Current-sourcing circuit (40) provides current to an external controller (18) in a normal manner when an external source of high voltage is not applied to the output connections (42,44), protects itself (40) and the voltage source (30) from damage when an external source of high voltage is applied to the output connections (42,44), and provides current to the external controller (18) in a normal manner after the external source of high voltage is subsequently removed from the output connections (42,44). The arrangement may be employed as the dimming interface circuit (900) of an electronic dimming ballast (60) for gas discharge lamps to protect ballast circuitry from damage due to wiring errors during installation.

23 Claims, 6 Drawing Sheets

ARRANGEMENT FOR PROTECTING LOW-VOLTAGE CONTROL CIRCUITRY FROM EXTERNALLY APPLIED HIGH VOLTAGES, AND DIMMING BALLAST EMPLOYING SUCH AN ARRANGEMENT

FIELD OF THE INVENTION

The present invention relates to the general subject of control circuits. More particularly, the present invention relates to an arrangement for protecting certain types of control circuitry from externally applied high voltages, and a dimming ballast that employs such an arrangement.

BACKGROUND OF THE INVENTION

Several types of control systems, such as dimming ballasts for gas discharge lamps, include control circuitry that operates in conjunction with an external controller. The control circuitry often includes an interface arrangement, as described in FIG. 1, for providing current to an external controller 18 in accordance with the setting of the controller. Specifically, adjustment of the external controller 18 varies the amount of current that the controller draws from a DC voltage source 30 via a current-sourcing circuit 40; correspondingly, a voltage, $V_{CONTROL}$, within the interface circuit varies. $V_{CONTROL}$ is fed to other control circuitry in order to effect some type of action, such as adjusting the illumination level of a fluorescent lamp.

In a number of dimming ballasts, such as that which is disclosed in U.S. Pat. No. 5,457,360, the dimming control circuitry is designed for low voltage operation (i.e., 0 to 10 volts). The dimming control circuitry is usually damaged when a source of high voltage, such as conventional AC line voltage (e.g., 120 volts, 277 volts, etc.), is inadvertently connected to the low voltage dimming control wires. Application of AC line voltage to the dimming control wires, hereinafter referred to as a high-voltage AC fault, damages or destroys components in the dimming interface circuit, as well as other control circuitry that is connected to the dimming interface circuit.

The destructive consequences of a high voltage fault are particularly costly in installations where the dimming control wires from multiple ballasts (e.g., anywhere from 2 to 50 or more) are connected in parallel. As an example, FIG. 2 describes an installation that employs wire harness connectors. One half of the wire harness connector is miswired such that the AC power wires (i.e., black and white) are placed in the portion of the connector intended for the dimming control wires (i.e., violet and gray), and vice-versa. Consequently, when the two halves of the connector are coupled together, the dimming control wires will be connected to the AC line (e.g., 120 volts AC). The result is damage to the circuitry in each of the parallel connected ballasts. This type of wiring mistake is not uncommon in practice, probably because of the large number of wires and the complexity of the wiring within the lighting fixtures.

There are a number of existing approaches for protecting a dimming ballast from damage due to misapplied high voltage across the dimming control wires. One approach is to place a fuse/diode arrangement in the dimming interface circuit. Such an arrangement provides effective protection of the ballast circuitry, but is undesirable because of the simple fact that a blown fuse requires replacement. Because ballasts are not designed to be field repairable, fuse replacement is generally not an economically viable option. Moreover, even if it were practical, fuse replacement would require accessing the installed ballast, opening the ballast, and so forth.

Another approach involves placing an opto-coupler circuit with a high input impedance between the dimming interface circuit and the dimming control wires. This approach provides the significant benefit of non-destructive protection. However, because opto-couplers are known to suffer from very loose tolerances in their transfer characteristics, this approach may significantly detract from the desired operation of the dimming control circuitry and may introduce an unacceptable degree of variation in the resulting range of dimming that can be provided by the ballast. Moreover, use of this approach necessitates extensive redesign of the dimming control circuitry and/or the external dimming controller.

What is needed, therefore, is an arrangement for protecting control circuitry from externally applied high voltages in a non-destructive manner. A further need exists for a protection arrangement that is capable of being readily incorporated into existing control circuitry with minimal modifications, and that presents little or no degradation in the desired control range. Such an arrangement would represent a considerable advance over the prior art.

DETAILED DESCRIPTION OF THE PREFERRED EMBODIMENTS

Figure 3:
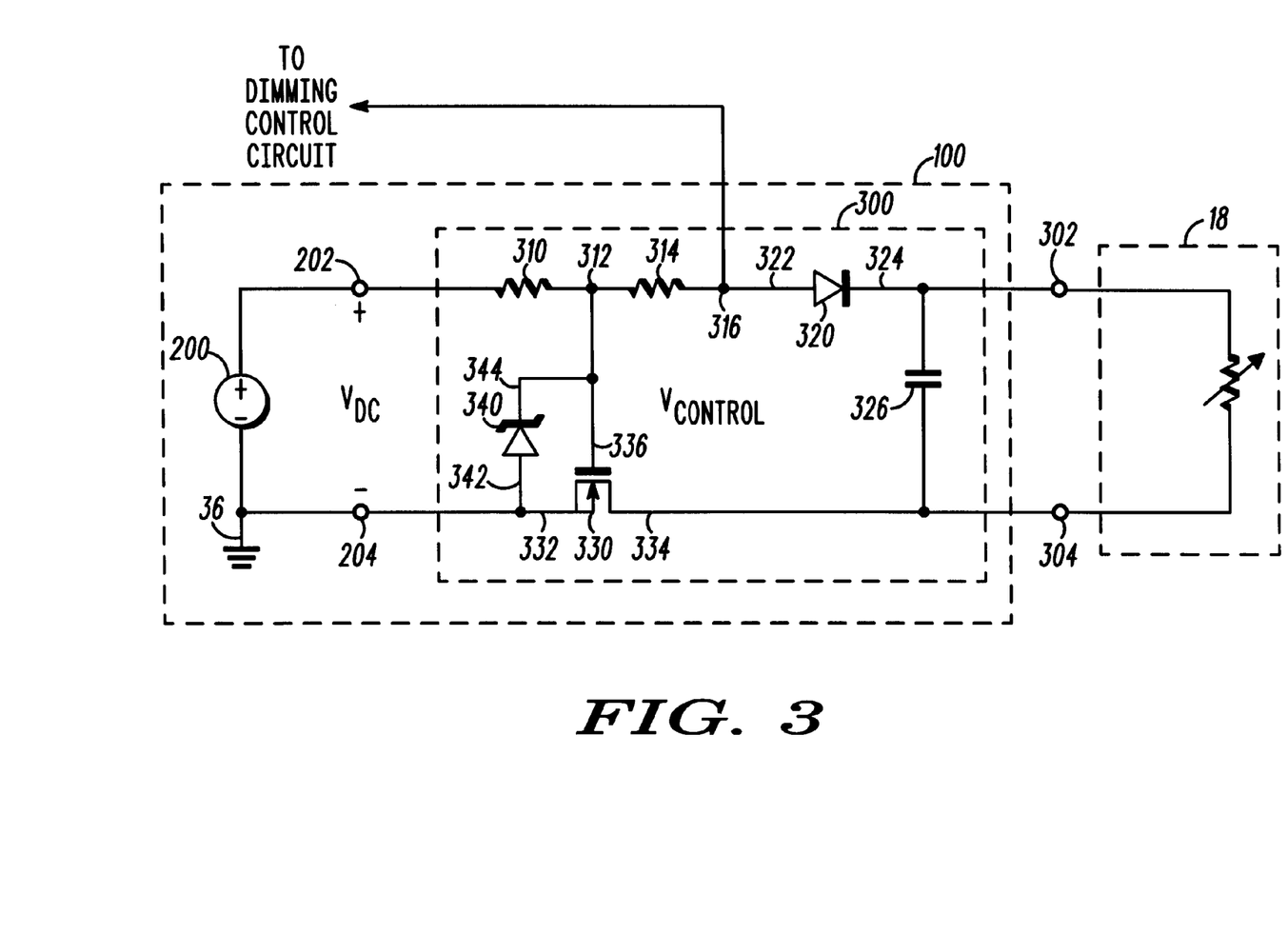
FIG. 3 describes a fault-protected arrangement for sourcing current to an external controller, in accordance with a preferred embodiment of the present invention.

FIG. 3 describes an arrangement 100 comprising a voltage source 200 and a current-sourcing circuit 300. Voltage source 200 has a positive terminal 202 and a negative terminal 204, and provides a substantially direct current voltage, $V_{DC}$, between terminals 202,204. Current-sourcing circuit 300 is coupled to the positive and negative terminals 202,204 of voltage source 200, and has first and second output connections 302,304 for coupling to an external controller 18. External controller 18 may be, for example, a standard dimming controller (e.g., model EL7315A manufactured by Honeywell, Inc.) designed for use with a dimming ballast for gas discharge lamps. For the sake of clarity, external controller 18 is depicted as a variable resistance, although it should be understood that commercially available dimming controllers usually include more sophisticated circuitry.

Figure 1:
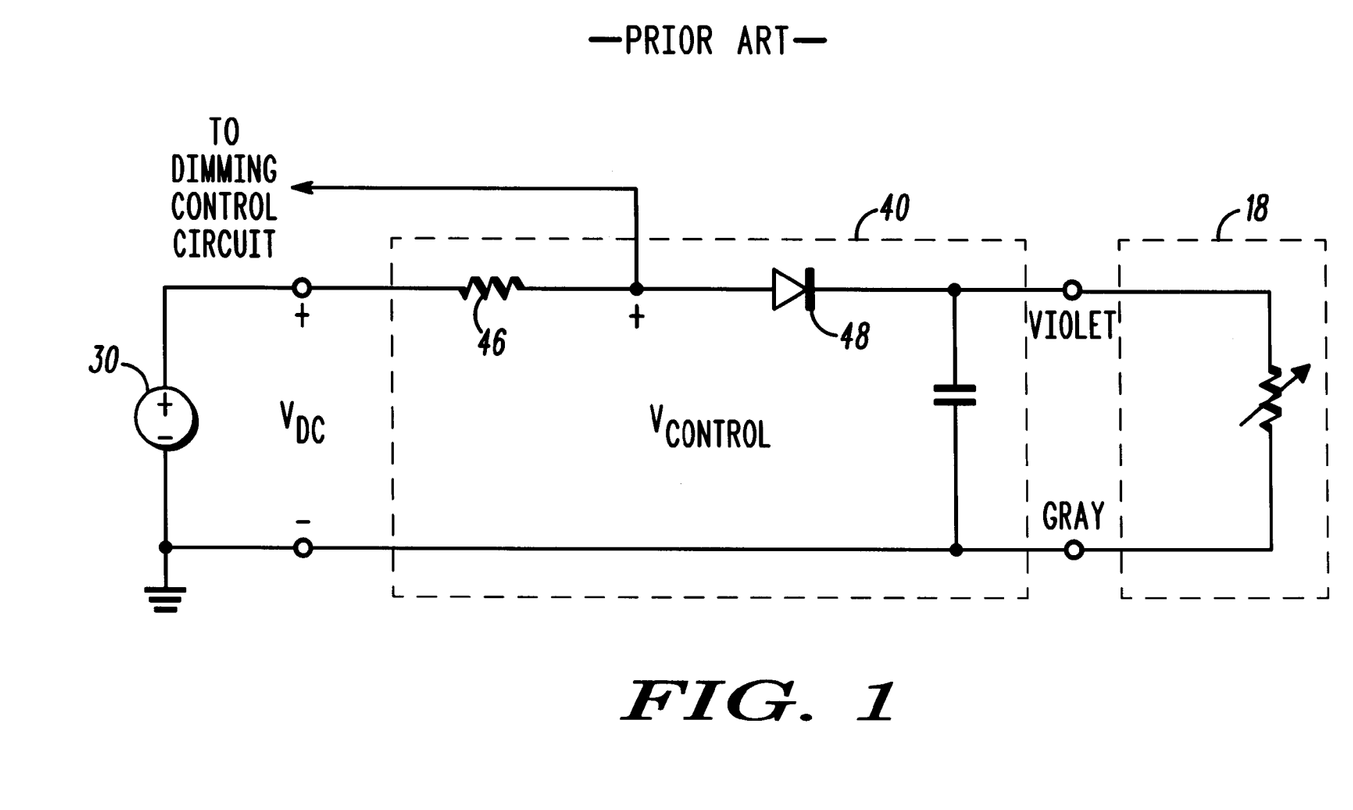
FIG. 1 describes a prior art arrangement for sourcing current to an external controller.
Figure 2:
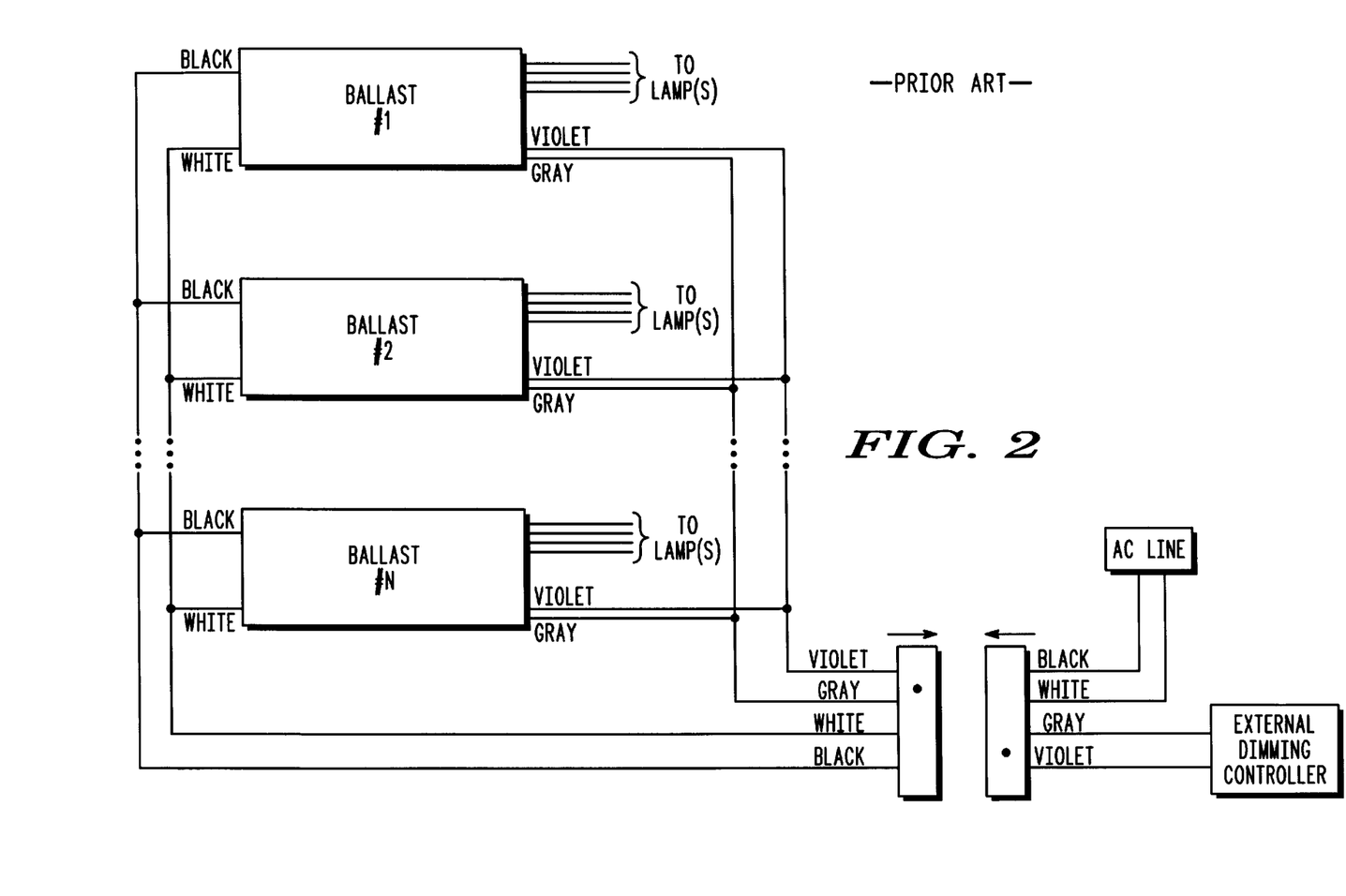
FIG. 2 describes a miswired arrangement with multiple parallel-connected dimming ballasts, in accordance with the prior art.

During normal operation, when an external source of high voltage is not applied to output connections 302,304, current-sourcing circuit 300 provides current to external controller 18 in a substantially normal manner, in similar fashion to that which was previously discussed with regard to the prior art circuit in FIG. 2. If, on the other hand, an external source of high voltage is applied to output connections due to miswiring, current-sourcing circuit 300 protects itself and voltage source 200 from damage by limiting the resulting voltages and currents. Significantly, current-sourcing circuit 300 resumes normal operation after the external source of high voltage is subsequently removed from output connections. Thus, in contrast with prior art approaches such as fuses, current-sourcing circuit 300 provides non-destructive protection from misapplied high voltages. Moreover, current-sourcing circuit 300 may be conveniently and economically implemented in place of existing circuits like current-sourcing circuit 40 in FIG. 1.

Referring again to FIG. 3, current-sourcing circuit 300 comprises a first resistor 310, a second resistor 314, a rectifier 320, and a transistor 330. First resistor 310 is coupled between the positive terminal 202 of voltage source 200 and a first node 312. Second resistor 314 is coupled between first node 312 and a second node 316. Rectifier 320 has an anode 322 coupled to the second node 316, and a cathode 324 coupled to first output connection 302. Transistor 330 has a first conduction lead 332 coupled to the negative terminal 204 of voltage source 200, a second conduction lead 334 coupled to second output connection 304, and a control lead 336 coupled to first node 312. Preferably, transistor 330 is a N-channel field-effect transistor (FET) having a gate lead 336 coupled to first node 312, a source lead coupled to 332 coupled to the negative terminal 204 of voltage source 200, and a drain lead 334 coupled to second output terminal 304. FET 330 should be selected to have a drain-to-source voltage rating that exceeds the maximum instantaneous voltage that may occur between output connections 302,304 during a high voltage fault condition. For example, transistor 330 may be implemented using a 2N60 FET, which has a 600 volt drain-to-source voltage rating that is more than adequate for surviving a high voltage condition wherein a 277 volt AC source (peak value=392 volts nominal) is inadvertently connected to output connections 302,304.

In practice, when replacing the prior art current-sourcing circuit 40 of FIG. 1 with the present circuit 300, resistors 310,314 should be chosen to provide the same total resistance as resistor 46 in FIG. 1. For example, if resistor 46 has a value of 20 kilohms, resistors 310,314 are preferably chosen to each have a resistance of 10 kilohms. In this way, arrangement 100 may be readily employed in existing dimming ballasts without requiring any modifications to other dimming control circuitry within the ballast.

Referring again to FIG. 3, current sourcing circuit 300 optionally includes a capacitor 326 and a voltage clamp 340. Capacitor 326 is coupled across output connections 302,304, and provides high frequency filtering and noise suppression. Voltage clamp 340 is preferably implemented as a zener diode 340 having a cathode 344 coupled to gate lead 336, and an anode coupled to source lead 332. Zener diode 340 protects transistor 330 from any damage due to high voltage transients. More specifically, in the event of a high voltage fault across output connections 302,304, a brief but substantially large pulse of voltage may pass to the gate of FET 330 via the parallel leakage capacitance of diode 320. Zener diode 340 suppresses such a pulse by preventing the gate voltage from exceeding a certain level, such as 12 volts.

Because of its structural simplicity and small number of components, arrangement 100 is well-suited for a number of control applications, such as in electronic dimming ballasts, for which size and cost are important constraints that may discourage or prohibit the use of more sophisticated and expensive protection methods.

Figure 4:
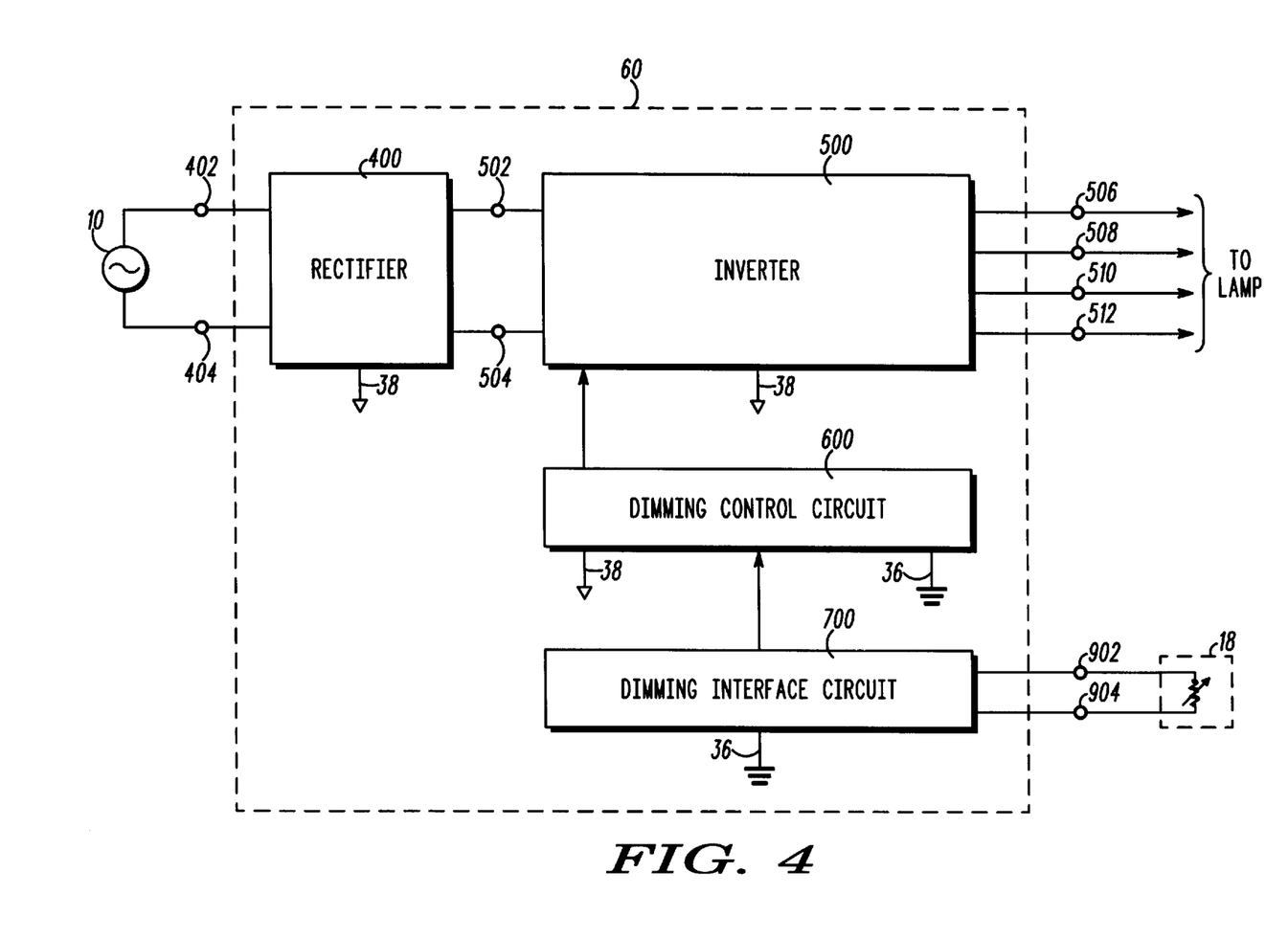
FIG. 4 is a block diagram schematic of an electronic dimming ballast, in accordance with a preferred embodiment of the present invention.

FIG. 4 is a block diagram schematic of an electronic ballast 60 for powering one or more gas discharge lamps at an adjustable illumination level. Ballast 60 comprises a rectifier 400, an inverter 500, a dimming control circuit 600, and a dimming interface circuit 700. Rectifier circuit 400 receives a source of conventional alternating current 10. such as 120 volts AC, between input terminals 402,404, and provides a substantially direct current voltage to the input terminals 502,504 of inverter 500. Inverter 500 provides high frequency power to a lamp via output wires 506,508, 510,512.

Figure 5:
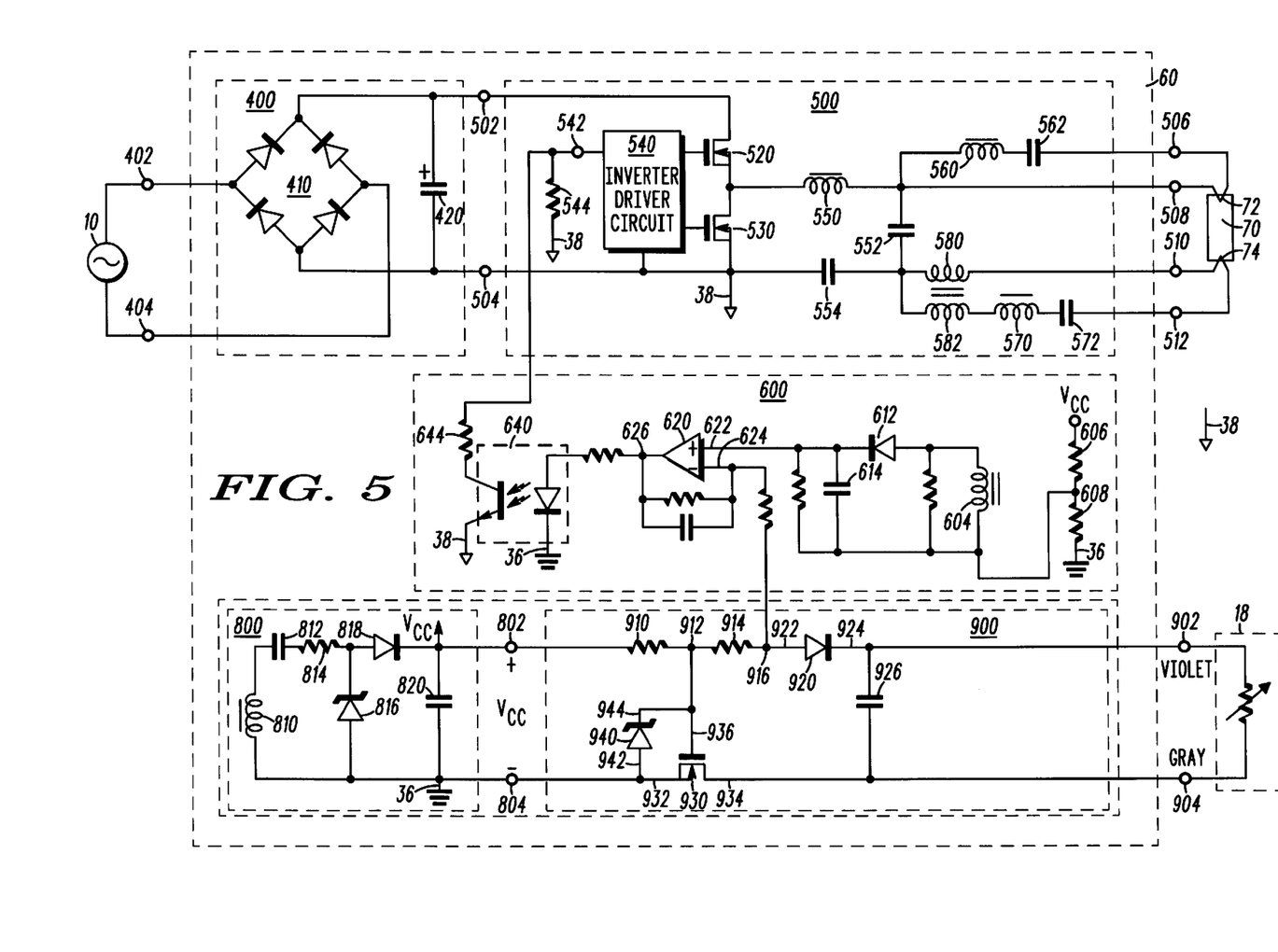
FIG. 5 is a detailed schematic of an electronic dimming ballast with a fault-protected dimming interface circuit, in accordance with a preferred embodiment of the present invention.

Turning now to FIG. 5, rectifier circuit 400 preferably includes a full-wave diode bridge 410 and a filtering capacitor 420. Inverter 500 includes an inverter driver circuit 540 that commutates inverter transistors 520,530 in a substantially complementary fashion, and at an adjustable high frequency rate that is preferably in excess of 20,000 Hertz. Inverter driver circuit 540 has an input 542 for receiving a dimming control signal from dimming control circuit 600, and is operable to set the illumination level of the lamp(s) in accordance with the dimming control signal. Specifically, the frequency at which inverter driver circuit 540 commutates transistors 520,530, hereinafter referred to as the inverter operating frequency, is adjusted according to the value of the dimming control signal. Inverter driver circuit 540 may be implemented using any of a number of suitable devices, such as the L6574 high-side driver integrated circuit manufactured by ST Microelectronics. Input 542 corresponds to the "frequency control" input (e.g., pin 4 of the L6574 device) of the particular device employed. The inverter operating frequency is approximately inversely proportional to the "effective" resistance present between frequency control input 542 and ballast ground node 38. In the absence of a dimming control signal, the inverter operating frequency is determined solely by the value of resistor 544.

Inductor 550 and capacitor 552 form a series resonant tank circuit that provides a high voltage for igniting lamp 70, as well as a magnitude-limited current for powering lamp 70 during normal operation. As the operating frequency of inverter driver circuit 540 is changed, so too is the amount of current that the resonant circuit provides to lamp 70. Capacitor 554 serves as a DC blocking capacitor. Windings 560,570 are magnetically coupled to resonant inductor 550, and provide voltage for heating the filaments 72,74 of lamp 70. Capacitors 562,572 provide an impedance that protects against damage to windings 560,570 in the event of a "filament short" in which output wires 506,508 or output wires 510,512 become shorted due to a wiring mistake. Other details regarding the operation of resonant inductor 550, resonant capacitor 552, DC blocking capacitor 554, windings 560,570, and capacitors 562,572 are well-known to those skilled in the art of electronic ballasts.

Winding 580 is magnetically coupled to windings 582 and 604 in dimming control circuit 600. The magnetic coupling between windings 580, 582 provides filament current cancellation and thus allows winding 604 in dimming control circuit 600 to develop a voltage that is approximately proportional to the amount of current provided to lamp 70.

Dimming control circuit 600 is coupled to inverter driver circuit 540. As previously mentioned, dimming control circuit 600 provides a dimming control signal to inverter driver circuit 540 so as to control the frequency of operation of inverter 500. Many of the operational details of dimming control circuit 600 are substantially similar to those of the dimming control circuit disclosed in U.S. Pat. No. 5,457,360, the disclosure of which is incorporated herein by reference.

The voltage across winding 604, which is approximately proportional to the actual lamp current, is rectified and filtered by diode 612 and capacitor 614. The rectified lamp current signal is coupled to the non-inverting (+) input 622 of comparator 620. The inverting (−) input 624 of comparator 620 is coupled to current-sourcing circuit 900 and receives a voltage, $V_{CONTROL}$, that is indicative of the desired lamp current. Effectively, comparator 620 compares the actual lamp current with the desired lamp current, and modifies the voltage at its output 626 accordingly. Resistors 606,608 provide a voltage offset to ensure that the rectified "actual lamp current" signal is at an appropriate level for comparison with the "desired lamp current" signal from current-sourcing circuit 900. The output 626 of comparator 620 is connected to an opto-coupler 640 that provides electrical isolation between control ground 36 and ballast ground 38. In accordance with the voltage at comparator output 626, opto-coupler 640 limits the amount of current that is allowed to flow in resistor 644 and thus controls the operating frequency of inverter driver circuit 540.

For example, if the actual lamp current is greater than the desired lamp current, dimming control circuit 600 will act to reduce the actual lamp current by increasing the inverter operating frequency. Specifically, if the actual lamp current is greater than the desired lamp current, the voltage at comparator output 626 will be relatively high and cause opto-coupler 640 to allow a relatively large amount of current to low through resistor 644. A relatively large amount of current through resistor 644 has the effect of decreasing the "effective" resistance present at frequency control input 542 of inverter driver circuit 540, and thus causes an increase in the inverter operating frequency. The increased inverter operating frequency causes a decrease in the actual lamp current.

Conversely, if the actual lamp current is less than the desired lamp current, dimming control circuit 600 will act to increase the actual lamp current by decreasing the inverter operating frequency. Specifically, if the actual lamp current is less than the desired lamp current, the voltage at comparator output 626 will be relatively low and cause opto-coupler 640 to allow only a relatively small amount of current, if any, to flow through resistor 644. A relatively small amount of current through resistor 644 has the effect of increasing the "effective" resistance present at frequency control input 542, and thus causes a decrease in the inverter operating frequency. The decreased inverter operating frequency causes an increase in the actual lamp current. In this way, dimming control circuit 600 sets the inverter operating frequency so that inverter 500 provides the desired lamp current.

Dimming interface circuit 700 is coupled to dimming control circuit 600, and has a pair of output connections 902,904 for coupling to an external dimming controller 18. Dimming interface circuit 900 provides current to external dimming controller 18 in accordance with the impedance presented by dimming controller 18. Correspondingly, the voltage at node 916 is controlled by the setting of dimming controller 18. The voltage at node 916 is processed by dimming control circuit 600 to control the frequency at which inverter 500 is operated which, in turn, determines the illumination level of the lamp(s).

During operation, dimming interface circuit 700 has the following functions:

(1) to supply current to external dimming controller 18 in accordance with the setting of controller 18;

(2) to provide to dimming control circuit 600 a control voltage (i.e., between node 916 and control ground 36) corresponding to the setting of external dimming controller 18;

(3) to provide current to controller 18 in a substantially normal manner when an external source of high voltage is not applied to output connections 902,904; and (4) to protect itself and the dimming control circuit 600 from damage when an external source of high voltage is applied (through miswiring or some other error) to output connections 902,904, and then provide current to controller 18 in a substantially normal manner if and when the external source of high voltage is subsequently removed from output connections 902,904.

Dimming interface circuit 700 includes a voltage source 800 and a current-sourcing circuit 900. Voltage source 800 has a positive terminal 802 and a negative terminal 804, across which is provided a substantially DC voltage that is typically chosen to be on the order of about 10 to 11 volts. Voltage source 800 preferably includes a source winding 810, a first capacitor 812, a resistor 814, a zener diode 816, a rectifier 818, and a second capacitor 820. Source winding 810 is magnetically coupled to resonant inductor 550. By transformer action, when inverter 500 is operating, source winding 810 provides a scaled-down version of the high frequency AC voltage that is present across resonant inductor 550. Capacitor 812 and resistor 814 serve as current-limiting impedances.

Zener diode 816 serves as a regulator that prevents the voltage $V_{CC}$ from exceeding a predetermined level. Prior to ignition of lamp 70, a relatively large voltage ordinarily develops across resonant inductor 550, and thus across winding 810. In the absence of zener diode 816 or some other regulating means, $V_{CC}$ might become undesirably large under such conditions. Zener diode 816 prevents this from occurring. Rectifier 818 provides half-wave rectification of the high frequency AC voltage provided by winding 810. Capacitor 820 acts as a filtering capacitor for "smoothing out" the rectified voltage between terminals 802,804.

Current-sourcing circuit 900 has the same preferred structure as current-sourcing circuit 300 which was previously described with reference to FIG. 3. As illustrated in FIG. 5, current-sourcing circuit 900 comprises a first resistor 910, a second resistor 914, a rectifier 920, and a transistor 930. First resistor 910 is coupled between positive terminal 802 of voltage source 800 and a first node 912. Second resistor 914 is coupled between first node 912 and a second node 916. Rectifier 920 has an anode 922 coupled to second node 916 and a cathode 924 coupled to first output connection 902. Transistor 930, which is preferably implemented as a N-channel field effect transistor (FET), has a gate lead 936 coupled to first node 912, a source lead 932 coupled to the negative terminal 804 of voltage source 800, and a drain lead 934 coupled to second output connection 904. Transistor 930 is preferably implemented using a high voltage power transistor, such as a 2N60 FET.

Current-sourcing circuit 900 optionally includes a capacitor 926 and a zener diode 940. Capacitor 926 provides high frequency filtering and noise suppression. Zener diode 940 has an anode 942 coupled to the source lead 932 of FET 930, and a cathode 944 coupled to the gate lead 936 of FET 930. Zener diode 940 limits the gate-to-source voltage of FET 930 to a predetermined level (e.g., 12 volts) and thereby prevents any momentary high voltage that might be transferred to the gate of transistor 930 via the leakage capacitance of diode 920.

During normal operation, when a standard dimming controller is coupled to output connections 902,904 and no external source of high voltage is mistakenly applied to output connections 902,904, FET 930 will be on. FET 930 has a gate-to-source turn-on voltage, $V_{GS,ON}$, of between 2 to 4 volts. $V_{GS,ON}$ is defined as the value of gate-to-source voltage for which FET 930 begins to conduct current as an approximately linear function of the gate-to-source voltage. For the sake of explanation herein, $V_{GS,ON}$ will be assumed to be about 2.5 volts. $V_{CC}$ is assumed to be at its preferred value of about 10 volts. When dimming controller 18 is at its minimum setting (i.e., such that its equivalent resistance or impedance is approximately zero), the voltage between dimming wires 902,904 will be approximately zero volts. Correspondingly, the voltage between the gate lead 936 and the source lead 932 of FET 930 will be about 5 volts (neglecting the 0.6 volt forward voltage drop across diode 920), which is sufficient to cause FET 930 to be fully on. Conversely, when dimming controller 18 is at its maximum setting (i.e., such that its effective resistance is much greater than 20 kilohms), the voltage between dimming wires 902, 904 will be almost 10 volts. Correspondingly, the voltage between the gate lead 936 and the source lead 932 of FET 930 will be about 10 volts, which is more than sufficient to ensure that FET 930 is fully on.

The detailed operation of current-sourcing circuit 900 under a high voltage AC fault condition (i.e., when, through miswiring or some other error, an external source of high voltage AC is inadvertently applied to output connections 902,904) is now explained with reference to FIGS. 6, 7, and 8 as follows. For clarity, capacitor 926 and zener diode 940 have been left out, since these components are not required in order to understand the essential operation of current-sourcing circuit 900 under a high voltage fault condition.

Figure 6:
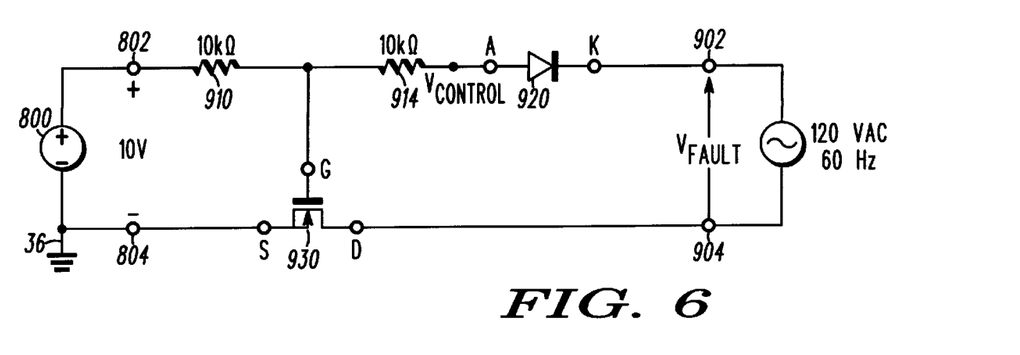
FIG. 6 is a simplified schematic of a dimming interface circuit under a high voltage AC fault condition, in accordance with a preferred embodiment of the present invention.

Referring first to FIG. 6, voltage source 800 is depicted in its preferred equivalent form as a 10 volt DC source. Resistors 910,914 each have a resistance of about 10 kilohms, which was found to be a suitable value in practice. The voltage, $V_{CONTROL}$, provided to dimming control circuit 600 is defined as the voltage that is present between the anode of diode 920 and control ground node 36. The external source of high voltage is a standard 120 volt rms (root-mean-square), 60 Hertz AC source that sinusoidally varies between about +170 volts and about −170 volts.

Figure 7:
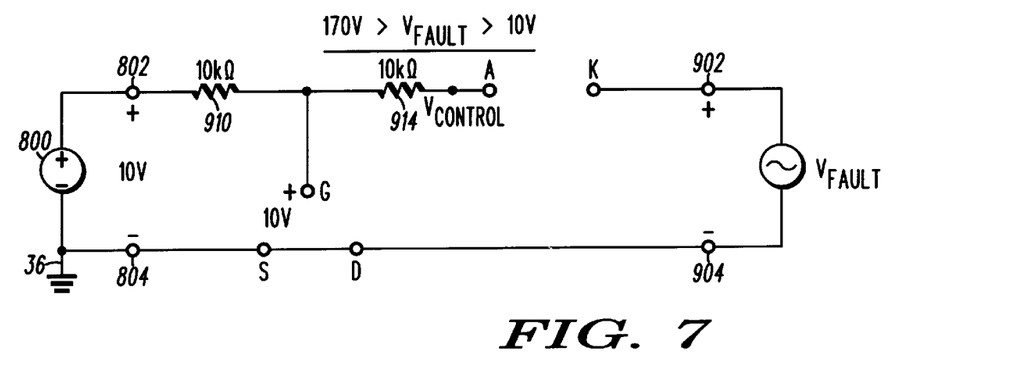
FIG. 7 is an equivalent circuit for the dimming interface circuit of FIG. 6 when the AC fault voltage is between approximately +10 volts and +170 volts, in accordance with a preferred embodiment of the present invention.

FIG. 7 describes the equivalent circuit during the positive half-cycles of $V_{FAULT}$ (i.e., when $V_{FAULT}$ is between about +10 volts and +170 volts). As long as $V_{FAULT}$ is greater than about +10 volts, diode 920 (see FIG. 6) is reverse-biased and thus behaves as an approximate open circuit. The gate-to-source voltage, $V_{GS}$, of the FET will be +10 volts, so the FET will be fully on and thereby provide an approximate short circuit between its drain (D) and source (S) terminals. Because the diode is reverse-biased, no current flows in the circuit, even with the FET being fully on. Consequently, $V_{CONTROL}$ will be equal to +10 volts. Thus, as in the prior art circuit described in FIG. 2, diode 920 protects the circuit from any damage that might occur during the positive half-cycles of $V_{FAULT}$.

Figure 8:
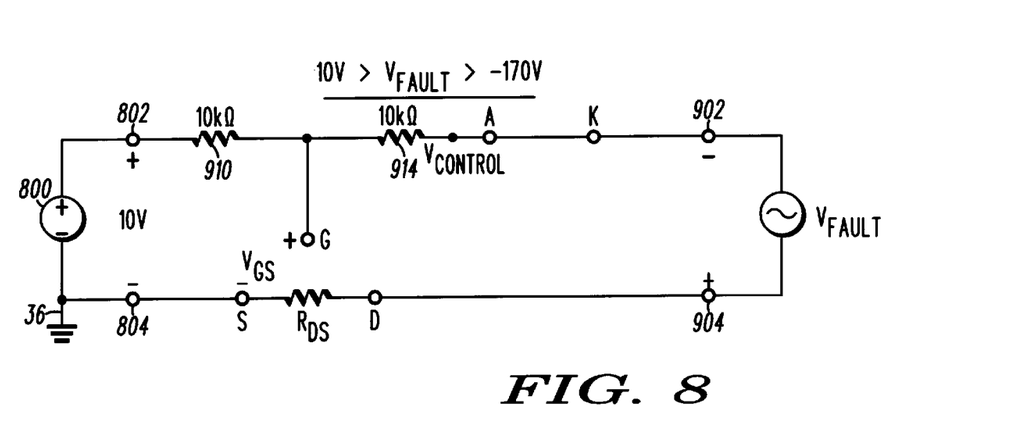
FIG. 8 is an equivalent circuit for the dimming interface circuit of FIG. 6 when the AC fault voltage is between approximately +10 volts and −170 volts, in accordance with a preferred embodiment of the present invention.

Turning now to FIG. 8, during the negative half-cycles of $V_{FAULT}$ (i.e., when $V_{FAULT}$ is between +10 volts and −170 volts), diode 920 is forward-biased and thus offers no protection by itself. However, when $V_{FAULT}$ falls below approximately −5 volts or so, the FET will cease to be fully on and will instead begin to operate in a linear mode (i.e., neither fully on nor fully off) and provide a drain-to-source resistance, $R_{DS}$, that varies with the instantaneous magnitude of $V_{FAULT}$. $R_{DS}$ will be sufficiently large (e.g., as high as hundreds of kilohms or more) to limit the resulting voltages and currents to values low enough to prevent damage to the circuit. For example, when $V_{FAULT}$ is at a relatively small value, such as −10 volts, $R_{DS}$ will have a value on the order of less than about 10 kilohms; when $V_{FAULT}$ is at a relatively large value, such as −170 volts, $R_{DS}$ will have a value on the order of hundreds of kilohms. Thus, $R_{DS}$ effectively adjusts itself so that $V_{GS}$ remains at about 2.5 volts. Consequently, the current in the circuit is limited to about 750 microamperes or so.

While operating in the linear mode during the negative half-cycles of $V_{FAULT}$, the FET behaves as a voltage-controlled resistance, wherein any decrease in $V_{GS}$ causes an increase in $R_{DS}$, and any increase in $V_{GS}$ causes a decrease in $R_{DS}$. For a FET operating in the linear mode, a relatively small change in $V_{GS}$ produces a comparatively large change in $R_{DS}$. As the instantaneous value of $V_{FAULT}$ becomes more negative, $V_{GS}$ will fall a little below 2.5 volts. The reduction in $V_{GS}$ causes $R_{DS}$ to increase. The resulting increase in $R_{DS}$, in turn, reduces the current through resistor 910 and thereby keeps the reduction in $V_{GS}$ relatively modest (e.g., on the order of millivolts). On the other hand, as the instantaneous value of $V_{FAULT}$ becomes less negative, $V_{GS}$ will rise above 2.5 volts. The increase in $V_{GS}$ causes $R_{DS}$ to decrease. The resulting decrease in $R_{DS}$, in turn, increases the current through resistor 910 and thereby keeps the increase in $V_{GS}$ relatively modest (e.g., on the order of millivolts). Because $V_{GS}$ remains relatively close to 2.5 volts, the current through resistor 910 does not change very much throughout the negative half-cycles of $V_{FAULT}$. It can therefore be seen that the FET operates as an approximate constant current regulator that limits the current to about 750 microamperes, regardless of the instantaneous value of $V_{FAULT}$.

Significantly, during the negative half-cycles of $V_{FAULT}$, $V_{CONTROL}$ will go no lower than about −5 volts with respect to control ground node 36. As previously mentioned, $V_{CONTROL}$ will go no higher than about +10 volts during the positive half-cycles of $V_{FAULT}$. Thus, at all times, $V_{CONTROL}$ is kept sufficiently small to prevent damage to the dimming control circuitry in the ballast.

The steady-state power dissipated in the FET during a high voltage fault condition is a function of $V_{FAULT}$ and the resistances of resistors 910,914. For example, assuming that $V_{FAULT}$ is a 277 volt rms AC source, $V_{GS,ON}$ is equal to 2.5 volts, and resistors 910,914 each have a resistance of 10 kilohms, the current through the FET will be zero during the positive half-cycles of $V_{FAULT}$ and about 750 microamperes during the negative half-cycles of $V_{FAULT}$. During the positive half-cycles of $V_{FAULT}$, the drain-to-source voltage, $V_{DS}$, of the FET will be approximately zero; during the negative half-cycles of $V_{FAULT}$, $V_{DS}$ will approximately follow the instantaneous value of $V_{FAULT}$. In other words, $V_{DS}$ will be an approximately half-wave rectified version of $V_{FAULT}$. The power dissipated in the FET, which is approximately equal to the product of the rms current through the FET and the rms value of $V_{DS}$, will be less than about 100 milliwatts. Thus, the power dissipation in the FET will be quite modest and well within the power handling capabilities of commercially available high voltage transistors, such as the 2N60 FET.

Although the present invention has been described with reference to certain preferred embodiments, numerous modifications and variations can be made by those skilled in the art without departing from the novel spirit and scope of this invention. Although the foregoing description has focused on dimming ballasts for gas discharge lamps, it should be appreciated that the present invention is similarly applicable to other areas, such as certain types of building control systems, in which a current-sourcing circuit provides current to an external low voltage controller.

What is claimed is:

1. An arrangement, comprising:
   a voltage source having a positive terminal and a negative terminal, and operable to provide a substantially direct current (DC) voltage between the positive and negative terminals; and
   a current-sourcing circuit coupled to the positive and negative terminals of the voltage source, and having first and second output connections adapted for coupling to an external controller, wherein the current-sourcing circuit is operable to:
      (i) provide current to the external controller in a substantially normal manner when an external alternative control (AC) source of high voltage is not applied to the output connections; and
      (ii) protect itself and the voltage source from damage when an external (AC) source of high voltage is applied to the output connections, and then provide current to the external controller in a substantially normal manner after the external (AC) source of high voltage is subsequently removed from the output connections.

2. The arrangement of claim 1, wherein the external (AC) source of high voltage is a standard alternating current (AC) voltage source having a nominal root-mean-square (RMS) voltage that is approximately equal to one of: 120 volts, 230 volts, 277 volts, and 347 volts.

3. The arrangement of claim 1, wherein the current-sourcing circuit further comprises:
   a first resistor coupled between the positive terminal of the voltage source and a first node;
   a second resistor coupled between the first node and a second node;
   a rectifier having an anode coupled to the second node, and a cathode coupled to the first output connection; and
   a transistor having a first conduction lead coupled to the negative terminal of the voltage source, a second conduction lead coupled to the second output connection, and a control lead coupled to the first node.

4. The arrangement of claim 3, wherein the transistor is a N-channel field effect transistor having a gate lead coupled to the first node, a source lead coupled to the negative terminal of the voltage source, and a drain lead coupled to the second output connection.

5. The arrangement of claim 3, wherein the current-sourcing circuit further comprises a voltage clamp coupled between the control lead and the first conduction lead of the transistor.

6. The arrangement of claim 5, wherein the voltage clamp comprises a zener diode having:
   (i) a cathode coupled to the control lead of the transistor; and
   (ii) an anode coupled to the first conduction lead of the transistor.

7. The arrangement of claim 6, wherein:
   (i) the substantially DC voltage supplied by the voltage source is on the order of about 10 volts; and
   (ii) the zener diode has a zener voltage that is substantially greater than about 10 volts.

8. The arrangement of claim 1, wherein the external controller is a dimming controller and the arrangement is adapted for use in a ballast for powering at least one gas discharge lamp at an adjustable light level.

9. An arrangement, comprising:
   a voltage source having a positive terminal and a negative terminal, and operable to provide a substantially direct current (DC) voltage between the positive and negative terminals; and
   a current-sourcing circuit, comprising:
      first and second output connections adapted for coupling to an external controller;
      a first resistor coupled between the positive terminal of the voltage source and a first node;
      a second resistor coupled between the first node and a second node;
      a rectifier having an anode coupled to the second node, and a cathode coupled to the first output connection; and
      a transistor having a first conduction lead coupled to the negative terminal of the voltage source, a second conduction lead coupled to the second output connection, and a control lead coupled to the first node.

10. The arrangement of claim 9, wherein the transistor is a N-channel field effect transistor (FET) having a gate lead coupled to the first node, a source lead coupled to the negative terminal of the voltage source, and a drain lead coupled to the second output connection.

11. The arrangement of claim 10, wherein the current-sourcing circuit further comprises a zener diode having:
   (i) a cathode coupled to the gate lead of the FET; and
   (ii) an anode coupled to the source lead of the FET.

12. The voltage source of claim 11, wherein:
   (i) the substantially DC voltage supplied by the voltage source is on the order of about 10 volts; and
   (ii) the zener diode has a zener voltage that substantially greater than about 10 volts.

13. The arrangement of claim 12, wherein the external controller is a dimming controller and the arrangement is adapted for use in a ballast for powering at least one gas discharge lamp at an adjustable light level.

14. An electronic ballast for powering at least one gas discharge lamp at an adjustable illumination level, comprising:
   an inverter for powering at least one gas discharge lamp, wherein the inverter includes an inverter driver circuit having an input for receiving a dimming control signal, and is operable to set the illumination level of the lamp in accordance with the dimming control signal;
   a dimming control circuit coupled to the inverter driver circuit and operable to provide the dimming control signal to the inverter driver circuit; and
   a dimming interface circuit coupled to the dimming control circuit, wherein the dimming interface circuit has first and second dimming control wires adapted for coupling to an external dimming controller, and is operable to:
      (i) supply current to the external dimming controller in accordance with a setting of the external dimming controller;

(ii) provide to the dimming control circuit a control voltage corresponding to the setting of the external dimming controller;

(iii) provide current to the external dimming controller in a substantially normal manner when an external alternative current (AC) source of high voltage is not applied to the dimming control wires; and (iv) protect the dimming control circuit from damage when an external (AC) source of high voltage is applied to the dimming control wires, and then provide current to the external dimming controller in a substantially normal manner after the external (AC) source of high voltage is subsequently removed from the dimming control wires.

15. The arrangement of claim 14, wherein the external (AC) source of high voltage is a standard alternating current (AC) voltage source having a nominal root-mean-square (RMS) voltage that is approximately equal to one of: 120 volts, 230 volts, 277 volts, and 347 volts.

16. The electronic ballast of claim 14, wherein the dimming interface circuit further comprises:

a voltage source having a positive terminal and a negative terminal, and operable to provide a substantially direct current (DC) voltage between the positive and negative terminals;

a current-sourcing circuit, comprising:

a first resistor coupled between the positive terminal of the voltage source and a first node;

a second resistor coupled between the first node and a second node;

a rectifier having an anode coupled to the second node, and a cathode coupled to the first dimming control wire; and a transistor having a source lead coupled to the negative terminal of the voltage source, a drain lead coupled to the second dimming control wire, and a gate lead coupled to the first node.

17. The electronic ballast of claim 16, wherein the dimming interface circuit further comprises a voltage clamp coupled between the gate lead of the transistor and the source lead of the transistor.

18. The electronic ballast of claim 17, wherein the voltage clamp comprises a zener diode having:

(i) a cathode coupled to the gate lead of the transistor; and (ii) an anode coupled to the source lead of the transistor.

19. The electronic ballast of claim 18, wherein:

(i) the voltage supplied by the DC voltage source is on the order of about 10 volts; and (ii) the zener diode has a zener voltage that is substantially greater than about 10 volts.

20. The electronic ballast of claim 16, wherein the control voltage corresponding to the setting of the external dimming controller is taken from the second node of the dimming interface circuit.

21. The electronic ballast of claim 16, wherein the voltage source of the dimming interface circuit is magnetically coupled to the inverter.

22. An electronic ballast for powering at least one gas discharge lamp at an adjustable illumination level, comprising:

an inverter for powering at least one gas discharge lamp, wherein the inverter includes an inverter driver circuit having an input for receiving a dimming control signal, and is operable to set the illumination level of the lamp in accordance with the dimming control signal;

a dimming control circuit coupled to the inverter driver circuit and operable to provide the dimming control signal to the inverter driver circuit; and a dimming interface circuit coupled to the dimming control circuit, wherein the dimming interface circuit has first and second dimming control wires adapted for coupling to an external dimming controller, and is operable to:

(i) supply current to the external dimming controller in accordance with a setting of the external dimming controller; and (ii) provide to the dimming control circuit a control voltage corresponding to the setting of the external dimming controller, wherein the dimming interface circuit further comprises:

a voltage source magnetically coupled to the inverter, the voltage source having a positive terminal and a negative terminal, and being operable to provide a substantially direct current (DC) voltage between the positive and negative terminals;

a first resistor coupled between the positive terminal of the voltage source and a first node;

a second resistor coupled between the first node and a second node;

a rectifier having an anode coupled to the second node, and a cathode coupled to the first dimming control wire; and a transistor having a source lead coupled to the negative terminal of the voltage source, a drain lead coupled to the second dimming control wire, and a gate lead coupled to the first node.

23. The electronic ballast of claim 22, wherein the dimming interface circuit further comprises a zener diode having a cathode coupled to the gate lead of the transistor, and an anode coupled to the source lead of the transistor.

* * * * *